United States Patent
Kanada et al.

(10) Patent No.: US 7,356,702 B2
(45) Date of Patent: Apr. 8, 2008

(54) REGISTRATION METHOD AND PROGRAM (75) Inventors: Yoriaki Kanada, Kanagawa (JP); Etsuo Shibasaki, Tokyo (JP); Shunsuke Furukawa, Tokyo (JP); Yoichiro Sako, Tokyo (JP); Akiya Saito, Kanagawa (JP); Kaoru Kijima, Tokyo (JP); Akiko Inoue, Saitama (JP); Koichi Nakajima, Chiba (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 775 days.

(21) Appl. No.: 10/485,261

(22) PCT Filed: Jun. 6, 2003

(86) PCT No.: PCT/JP03/07191

§ 371 (c)(1),
(2), (4) Date: Feb. 9, 2004

(87) PCT Pub. No.: WO03/104950

PCT Pub. Date: Dec. 18, 2003

(65) Prior Publication Data

US 2004/0187017 A1  Sep. 23, 2004

(30) Foreign Application Priority Data

Jun. 10, 2002  (JP)  ............... 2002-168944

(51) Int. Cl.
*G06F 1/24* (2006.01)
(52) U.S. Cl. ............. 713/182; 713/161; 713/156
(58) Field of Classification Search ........... 713/182, 713/161, 156
See application file for complete search history.

(56) References Cited

U.S. PATENT DOCUMENTS 5,490,216 A  2/1996  Richardson, III

FOREIGN PATENT DOCUMENTS

| JP | 6-195307 | 7/1994 |
| JP | 9-134284 | 5/1997 |
| JP | 10-31653 | 2/1998 |
| JP | 2001-243706 | 9/2001 |

*Primary Examiner*—Thomas R. Peeso
(74) *Attorney, Agent, or Firm*—Oblon, Spivak, McClelland, Maier & Neustadt, P.C.

(57) ABSTRACT

A processing method is disclosed. When a recording medium on which at least one program has been recorded is loaded, a program for a user registration is started. Identification information unique to the recording medium is read therefrom. The identification information that has been read and user's information that has been obtained are correlatively stored. After they have been stored, the program data is read from the recording medium.

25 Claims, 7 Drawing Sheets

REGISTRATION METHOD AND PROGRAM

TECHNICAL FIELD

The present invention relates to a registering method and a program that are applicable for a user registration performed when game software or application software recorded on for example a read-only (ROM) type optical disc is used the first time.

BACKGROUND ART

Programs of application software for use with computers are normally recorded on CD-ROM discs. When the user uses application software the first time, for example, he or she installs a software program to a personal computer, after he or she performs a user registration, he or she can use the application. When the user performs the user registration, he or she is normally required to input a so-called disc key, which is a number indicated for example on a registration sheet by which the application software is accompanied or on the case or the like of a CD-ROM of the program, and user information such as user's name, and so forth.

However, it is troublesome to perform a user registration that requires the user to input a large-digit number as a disc key and user's name.

Thus, an object of the present invention is to provide a registering method and a program that allow the user to easily perform a user registration and prevent him or her from redundantly performing it.

DISCLOSURE OF THE INVENTION

To accomplish the foregoing object, claim 1 of the present invention is a processing method, comprising the steps of:

starting a program for a user registration when a recording medium on which program data of at least one program has been recorded is loaded;

reading identification information that is unique to the recording medium therefrom;

correlatively storing the identification information that has been read and user's information that has been obtained; and reading the program data from the recording medium after the correlatively storing step has been completed.

Claim 14 of the present invention is a program, comprising the steps of:

starting a program for a user registration when a recording medium on which application program data of at least one application program has been recorded is loaded;

reading identification information that is unique to the recording medium therefrom; and correlatively storing the identification information that has been read and user's information that has been obtained.

BEST MODES FOR CARRYING OUT THE INVENTION

Next, an embodiment of the present invention will be described. According to the embodiment, a unique identification number has been recorded onto an optical disc, for example, a CD-ROM disc along with application software. An identification number is information with which an individual disc is identified. Since an identification number is to identify an individual disc, a symbol, characters, or the like can be used besides a number. An identification number identifies a predetermined number of CD-ROM discs on which application software has been recorded. An identification number is recorded onto a CD-ROM disc in such a manner that the identification number can be read by a reproducing apparatus, for example, a conventional CD player or a conventional CD-ROM drive. Next, for easy understanding of the embodiment, the structure of an optical disc, for example, a CD-ROM disc will be described.

Figure 1:
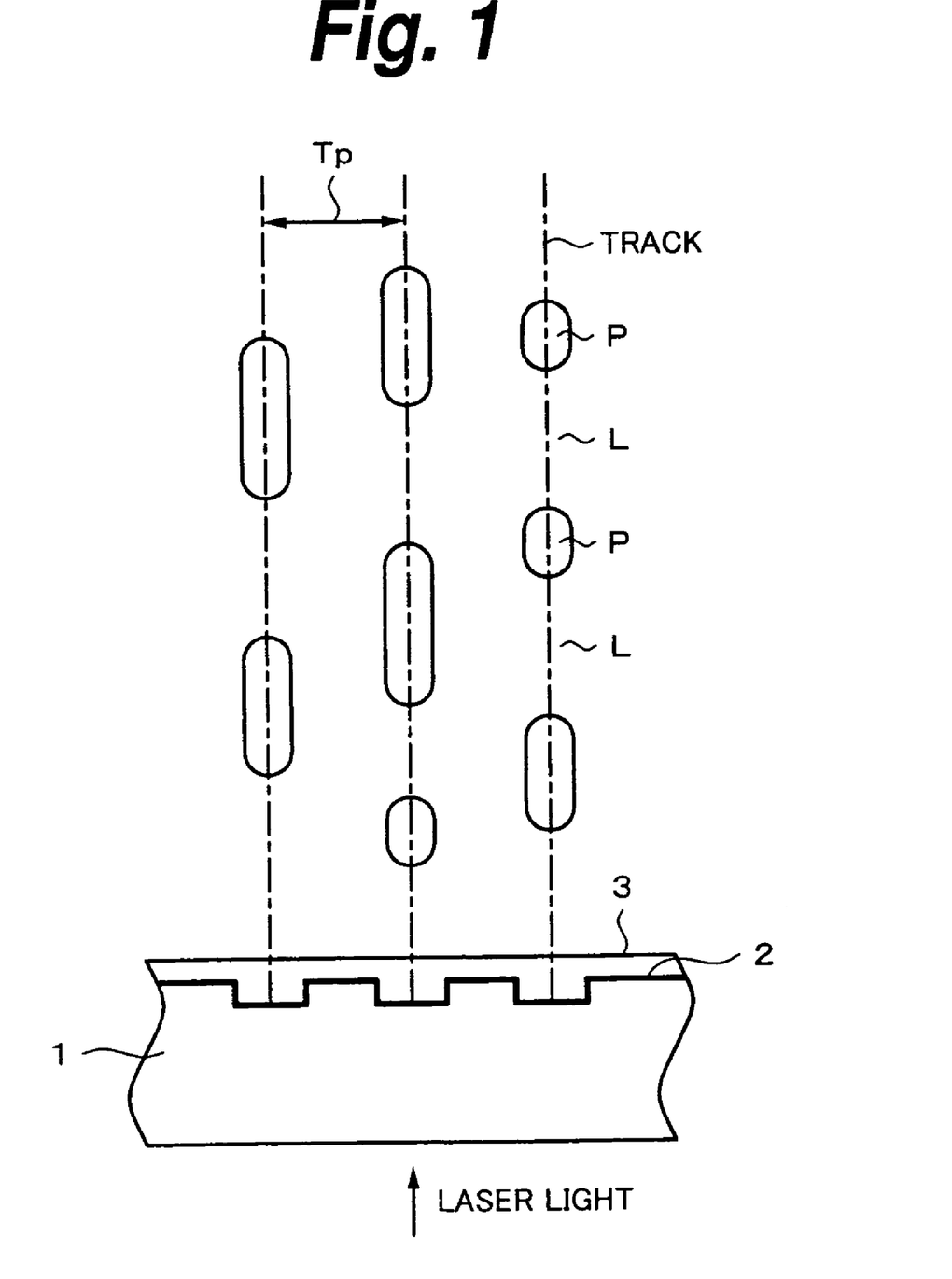
FIG. 1 is a schematic diagram describing a record pattern of a conventional CD and the structure thereof.

FIG. 1 is an enlarged view showing a part of a conventional CD-ROM disc. On each track having a predetermined track pitch Tp (for example, 1.6 µm), concave portions referred to as pits P and lands L are alternately formed. The length of each of the pits P and the lands L is in the range from 3T to 11T (where T represents the minimum inversion interval). Laser light is radiated onto one surface of the CD-ROM disc.

The CD-ROM disc is composed of a disc substrate 1, a reflection film 2, and a protection film 3 that are successively layered in the order viewed from the laser light incident side. The disc substrate 1 has a thickness of 1.2 mm and is transparent. The reflection film 2 is coated on the disc substrate 1 on which the pits P and the lands L are formed. The protection film 3 is coated on the reflection film 2. The reflection film 2 is made of a material having a high reflectance such as a metal, for example, aluminum. Although the CD-ROM disc is a read-only disc, as will be described later, after the reflection film 2 is coated by the spattering method, the evaporating method, or the like, information, that is, an identification number as identification information unique to the disc, is recorded onto the reflection film 2 by high level laser light.

Next, with reference to FIG. 2, a flow of steps of a production process of such a CD-ROM disc will be described. At step S1, a glass master disc of which photoresist, that is, a photosensitive substance, is coated on a disc shaped glass substrate is rotated by a spindle motor. Laser light that is turned on and off according to a record signal is radiated onto a photoresist film. The photoresist film is exposed by the laser light. The exposed photoresist film is developed. When the photoresist film is of positive type resist, the exposed portion is melted and a concave-convex pattern is formed on the photoresist film.

The developed glass master disc is plated by an electric plating process. As a result, one metal master is produced (at step S2). A plurality of mothers are produced from the metal master (at step S3). A plurality of stampers are produced from one mother (at step S4). With a stamper, the disc substrate 1 is produced. The disc substrate 1 can be produced by a known method, for example, the compression molding method, the injection molding method, or the light hardening method. At step S6, the reflection film 2 and the protection film 3 are formed on the side of the pits P and the lands L of the disc substrate 1. In the conventional disc producing method, a label is printed on the protection film 3 by the silk printing method or the like. As a result, a final CD-ROM disc is produced.

Figure 2:
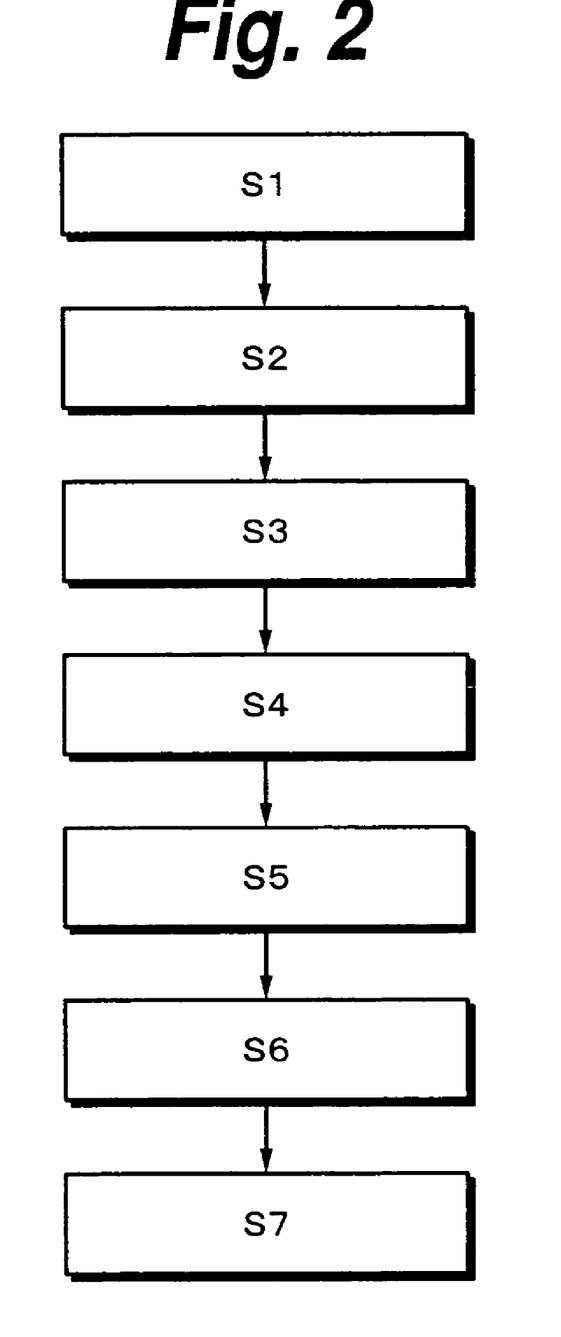
FIG. 2 is a schematic diagram describing production steps of a disc according to an embodiment of the present invention.

In the example shown in FIG. 2, at step S7 as an additional step, high level laser light is radiated onto the lands L as a mirror portion of the reflection film 2. In addition, information, that is, identification information unique to the disc, is additionally recorded thereonto. When laser light is radiated onto a land L of the reflection film 2, that is, a heat process (heat recording) is performed, atoms travel. As a result, the film structure and crystal structure vary. Thus, the reflectance of the portion decreases. Consequently, after laser light is radiated onto a land L, return laser light therefrom becomes weak. Thus, the reproducing apparatus recognizes the land L as a pit P. Using this phenomenon, the pit length or land length is varied. As a result, information, that is, identification information unique to the disc, can be recorded. In this case, a material whose reflectance varies with a radiation of high level laser light is used for the reflection film 2. Alternatively, a material whose reflectance increases with recording of information may be used for the reflection film 2.

In reality, the reflection film 2 is made of an aluminum alloy film $Al_{100-x}X_x$, where X is at least one element selected from a group consisting of Ge, Ti, Ni, Si, Tb, Fe, and Ag. The composition rate x of the Al alloy film is selected from 5<x<50 [atomic %].

The reflection film 2 may be made of an Ag alloy film $Ag_{100-x}X_x$, where X is at least one element selected from the group consisting of Ge, Ti, Ni, Si, Tb, Fe, and Al. The composition rate x of the Al alloy film is selected from 5<x<50 [atomic %]. In this case, the reflection film 2 can be formed on the disc substrate 1 by for example the magnetron spattering method.

It is assumed that the reflection film of an AlGe alloy is formed with a thickness of 50 nm and laser light is radiated from the transparent disc substrate 1 or the protection film 3 through an objective lens. When the composition rate of Ge is 20 [atomic %] and the recording power of laser light is in the range from 6 to 7 [mW], the reflectance decreases by around 6%. When the composition rate of Ge is 27.6 [atomic %] and the recording power is in the range from 5 to 8 [mW], the reflectance decreases by around 7 to 8%. When the reflectance varies, identification information unique to the disc can be additionally recorded on the reflection film 2.

Figure 3:
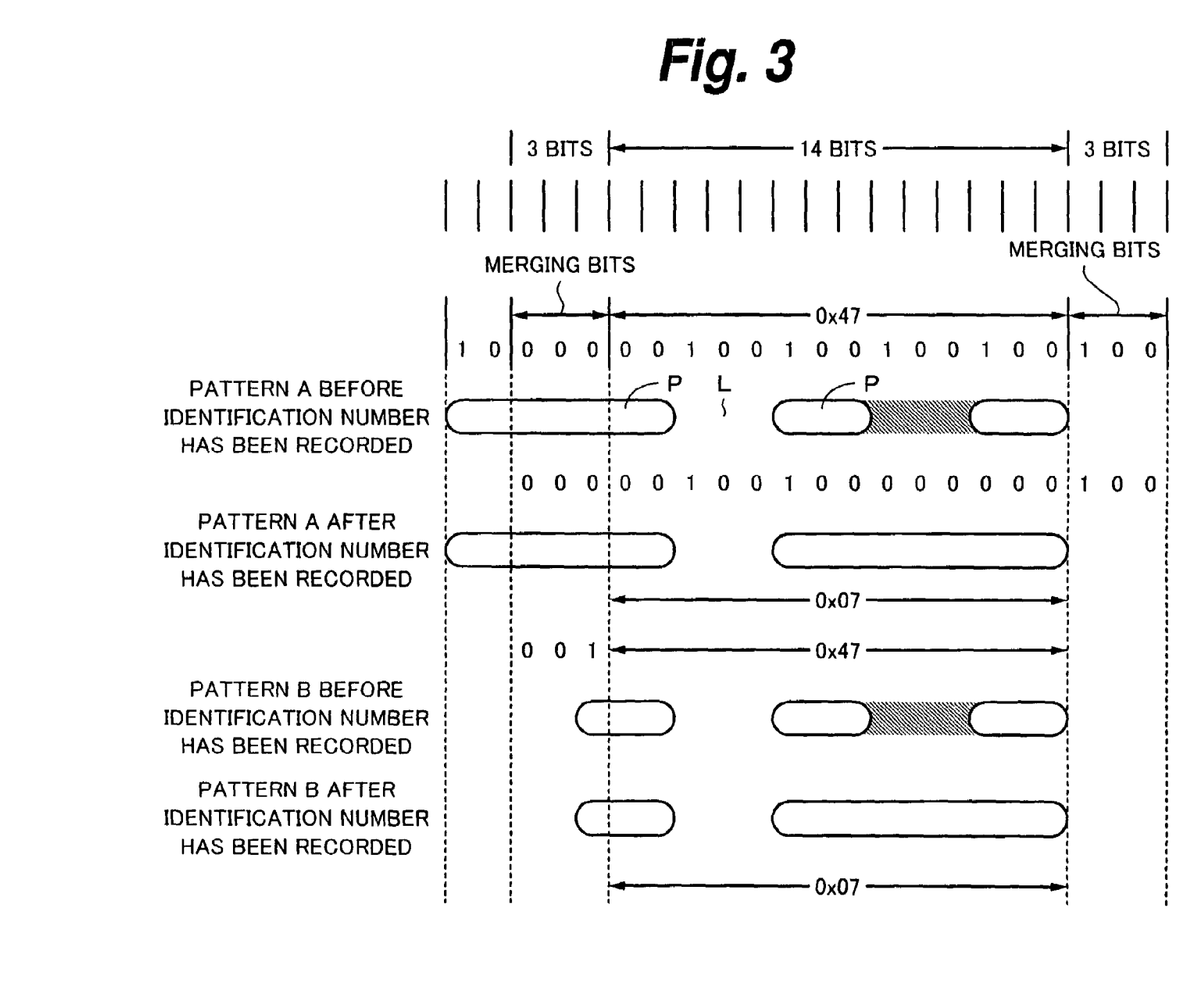
FIG. 3 is a schematic diagram describing write-once recording according to the embodiment of the present invention.

FIG. 3 is a schematic diagram more practically describing an additional recording method for an identification number as identification information unique to a disc. There may be two types of patterns that are pattern A and pattern B as the relation of record data, pits P, and lands L according to the relation of a portion of the identification number and a pattern of data symbols preceded thereby.

First, the pattern A will be described. Data recorded on a CD-ROM disc has been EFM modulated. Three bits, for example, merging bits (000), are placed between two adjacent data symbols. When an identification number is additionally recorded, eight-bit data symbol is for example (0×47), where "0×" represents hexadecimal notation. A 14-bit pattern (00100100100100) of which the eight bits have been EFM (eight to fourteen modulation) modulated is shown in FIG. 3.

High level laser light for additionally recording an identification number is radiated onto a hatched area between two adjacent pits, that is, a land portion. Since the reflection film 2 is made of the foregoing material, the reflectance of the hatched area decreases. After the identification number has been recorded, the two pits P are reproduced as one connected pit P. In this case, the 14-bit pattern becomes (00100100000000). When the 14-bit data is EFM demodulated, eight-bit data (0×07) is obtained.

In the case of the pattern B, merging bits (001) are selected. In this case, like the pattern A, when high level laser light is radiated to the hatched area, (0×47) can be varied to (0×07).

As described above, the original data symbol (0×47) can be rewritten to (0×07). Besides that example, there are many types of data that can be additionally recorded. For example, a data symbol (0×40) can be varied to (0×00). However, since the additional recording is performed by radiating laser light onto a mirror portion, that is, a land on which data has been recorded, the pit length or land length is varied. Thus, the types of data that can be additionally recorded are limited.

FIG. 3 is an example of a method for additionally recording an identification number. There are several other methods, for example, a method for intentionally generating an EFM error in a predetermined region and additionally recording an identification number depending on whether the EFM error is present or absent and a method for intentionally adding an error that cannot be corrected with an error correction code.

As described above, a CD-ROM disc on which an application program or software of for example a game has been recorded and an identification number has been additionally recorded is sold through a store to the user. The user is required to perform a user registration. For example, when the user loads the CD-ROM disc into his or her apparatus such as a computer, a program for a user registration automatically is started and the apparatus is entered into an automatic user registration mode. The program for the user registration is built in for example an install program. Once an application program is installed into an apparatus, for example, a computer, unless the CD-ROM disc is loaded thereinto, the next time the program for the user registration does not start. However, when a CD-ROM disc on which software of a game has been recorded is used, the application of the game, that is, the software of the game, is executed in the sate that the CD-ROM disc is loaded into an apparatus, for example, a game apparatus. Thus, in this case, whenever the CD-ROM disc is loaded into the game apparatus, the program for the user registration is started.

Figure 4:
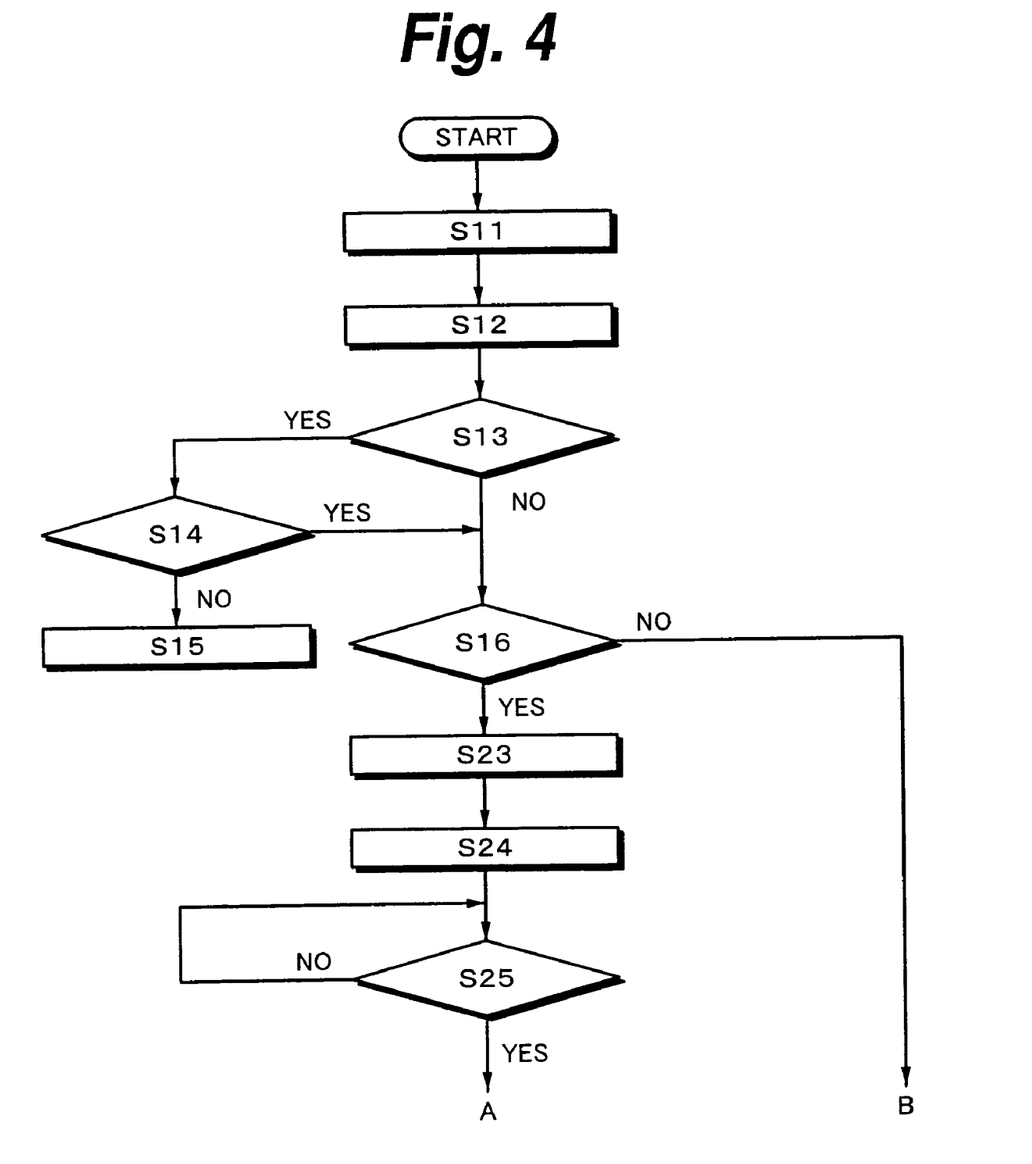
FIG. 4 is a flow chart showing a flow of a process performed by a user side according to the embodiment of the present invention.
Figure 5:
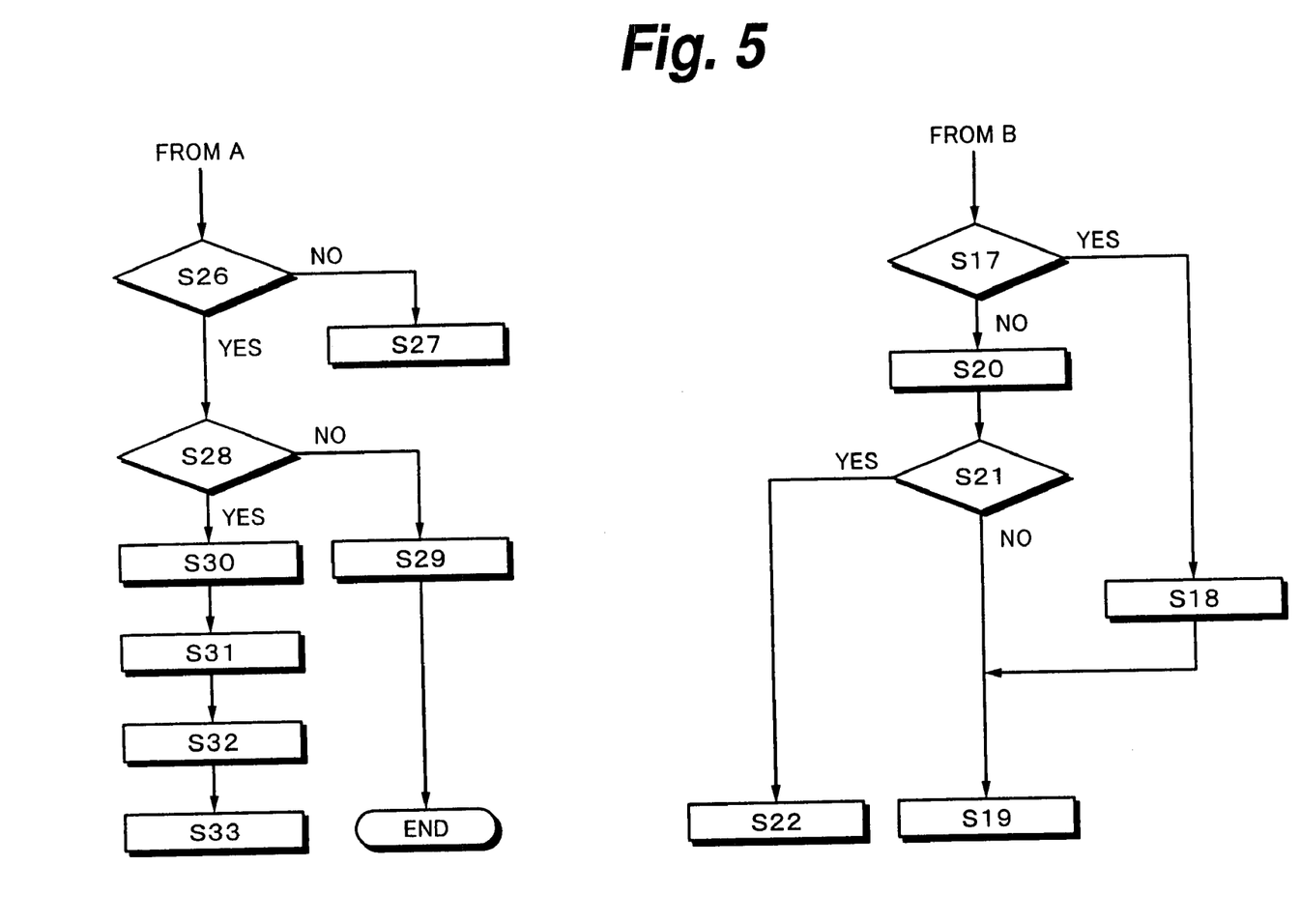
FIG. 5 is a flow chart showing a flow of the process performed by the user side according to the embodiment of the present invention.
Figure 6:
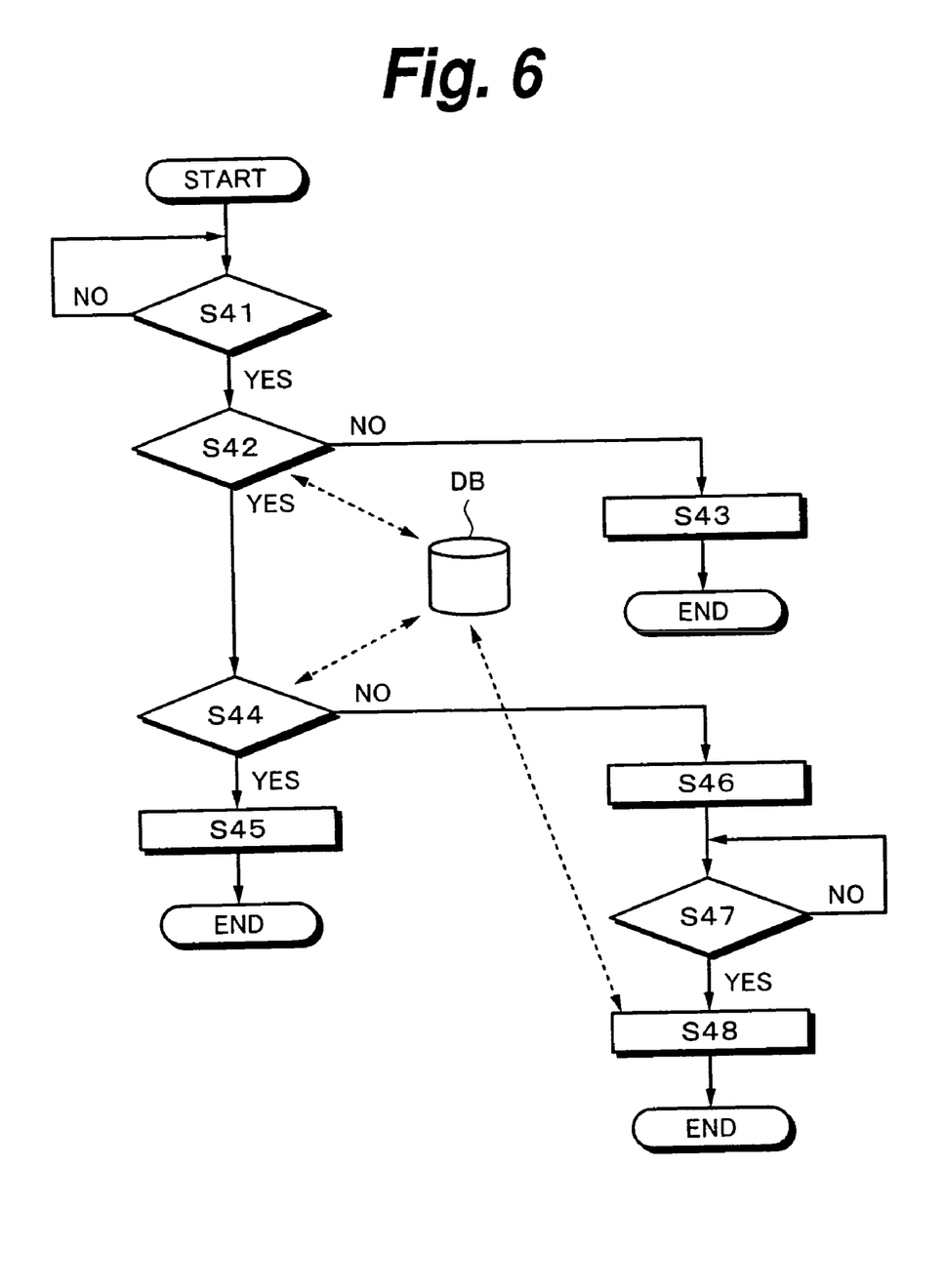
FIG. 6 is a flow chart showing a flow of a process performed by a server side according to the embodiment of the present invention.

FIG. 4 and FIG. 5 show an automatic registering process executed by a computer as a reproducing apparatus. FIG. 6 shows a process executed by a server (software company) side that manages identification numbers. Although FIG. 4 and FIG. 5 show a flow chart of the process executed by the computer, due to the limited drawing space, the flow chart is divided into two portions. When a CD-ROM disc on which software has been recorded and an identification number has been additionally recorded is loaded into the computer, a program for a user registration is started (at step S11). At step S12, a registration flag registered for each application is read to the computer. A registration flag represents whether or not a user registration has been performed for an application.

At step S13, with reference to the registration flag, it is determined whether or not the user registration has been performed. When the user registration has been performed, the flow advances to step S14. At step S14, it is determined whether or not the user wants to perform the user registration again. When the user does not want to perform the user registration again, the application is started (at step S15). When the determined result at step S13 represents that the user registration has not been performed or when the determined result at step S14 represents the user wants to perform the user registration again, the flow advances to step S16. At step S16, it is determined whether or not the user wants to perform the user registration at once.

When the determined result at step S16 represents that the user does not want to perform the user registration at once, the flow advances to step S17 shown in FIG. 5. At step S17, it is determined whether or not the application program is read from the CD-ROM disc the first time. When the determined result at step S17 represents that the application program is read from the CD-ROM disc the first time, the flow advances to step S18. At step S18, data of the first application program read date is registered to a storing portion such as a hard disc of the computer. Thereafter, the flow advances to step S19. At step S19, the application program is read from the CD-ROM disc and the application is started.

When the determined result at step S17 represents that the application program is not read from the CD-ROM disc the first time, the flow advances to step S20. At step S20, data of the first application program read date is read from a predetermined area of the hard disc of the computer. Thereafter, the flow advances to step S21. At step S21, it is determined whether or not a predetermined time has elapsed after the first application program read date. When the determined result at step S21 represents that the predetermined time has elapsed, the application is not started and the reproducing process of the CD-ROM disc is completed (at step S22). In other words, when the user has not performed the user registration and a predetermined application valid period has elapsed, the application cannot be used. When the reproducing process of the CD-ROM disc is completed at step S22, a message that reads that the CD-ROM disc cannot be used because the valid period has elapsed is displayed on a computer display. When the determined result at step S21 represents that the predetermined time has not elapsed, the application program is read from the CD-ROM disc and the application is started (at step S19).

When the determined result at step S16 shown in FIG. 4 represents that the user wants to perform the user registration at once, the flow advances to step S23. At step S23, the identification number is read from the CD-ROM disc. At step S24, the identification number that has been read is transmitted to the server of the software house. A communication between the server of the software house and the user is performed through a communication network such as Internet by conventional mail software. At step S25, the computer waits for data corresponding to the determined result of the transmitted identification number from the server of the software house.

FIG. 6 shows a process executed by the server. At step S41, it is determined whether or not an identification number has been received from the user side. When an identification number has been received, the flow advances to step S42. At step S42, it is determined whether or not the received identification number is a valid identification number. In this case, a management database DB that manages CD-ROM discs that have been produced with software of the server is referenced. When the determined result represents that the identification-number is not a valid identification number, data that represents that the identification number is not a valid identification number is transmitted to the user who has transmitted the identification number thereto (at step S43) and the process is completed.

When the determined result at step S42 represents that the identification number that has been transmitted from the user side is a valid identification number, the flow advances to step S44. At step S44, it is determined whether or not the identification number that has been transmitted had been registered with reference to the management database DB. When the determined result at step S44 represents that the identification number had been registered, the flow advances to step S45. At step S45, data that represents that the identification number had been registered is transmitted to the user and the process is completed.

When the determined result at step S44 represents that the identification number that has been transmitted from the user had not been registered, the flow advances to step S46. At step S46, data that represents that the identification number had not been registered is transmitted to the user. Thereafter, the flow advances to step S47. At step S47, it is determined whether or not data has been received from the user. When the server has received data of user's name and address, the server registers information of user's name and address transmitted therefrom to the management database DB. The management database DB correlatively stores an unregistered identification number and user's name and address. After the management database DB has registered them, the process is completed.

When the determined result at step S25 shown in FIG. 4 represents that data corresponding to the determined result of the transmitted identification number has been received from the server of the software house, the flow advances to step S26 shown in FIG. 5. At step S26, it is determined whether or not the identification number is a valid identification number according to the data received from the server. When the determined result represents that the identification number is not a valid identification number, the flow advances to step S27. At step S27, a message that reads that the identification number is not a valid identification number is displayed on the computer display.

When the determined result at step S26 represents that the identification number is a valid identification number, the flow advances to step S28. At step S28, it is determined whether or not the identification number had been unregistered according to the received data. When the determined result represents that identification number had been registered, a menu for a registered identification number is displayed on the computer display. Thereafter, the registering process is completed. An application that has been selected according to a displayed menu is started. When the determined result at step S28 represents that the identification number had not been registered, the flow advances to step S30. At step S30, a menu for a user registration is displayed on the computer display.

At step S31, according to the menu for the user registration displayed on the computer display, user's name and address are input. As the user information, besides user's name and address, information such as user's e-mail address, sex, and age can be used. Occasionally, apparatus information unique to hardware such as the computer that the user uses may be used as user information. In this case, since the apparatus information unique to hardware is automatically read, the user does not need to input it.

At step S32, the information of user's name and address, which has been input, is transmitted to the server of the software house. As described above, the server correlatively registers the information of user's name and address received therefrom and the identification number transmitted therefrom to the management database DB (at step S48). When user's name and address have been registered, the application is started (at step S33). In this case, the state of the registration flag of the application is changed to the state that represents that the user registration has been performed. Alternatively, at step S32, after the information of user's name and address has been transmitted, a message that reads that the server has completed the user registration may be received from the server and displayed on the computer display.

Figure 7:
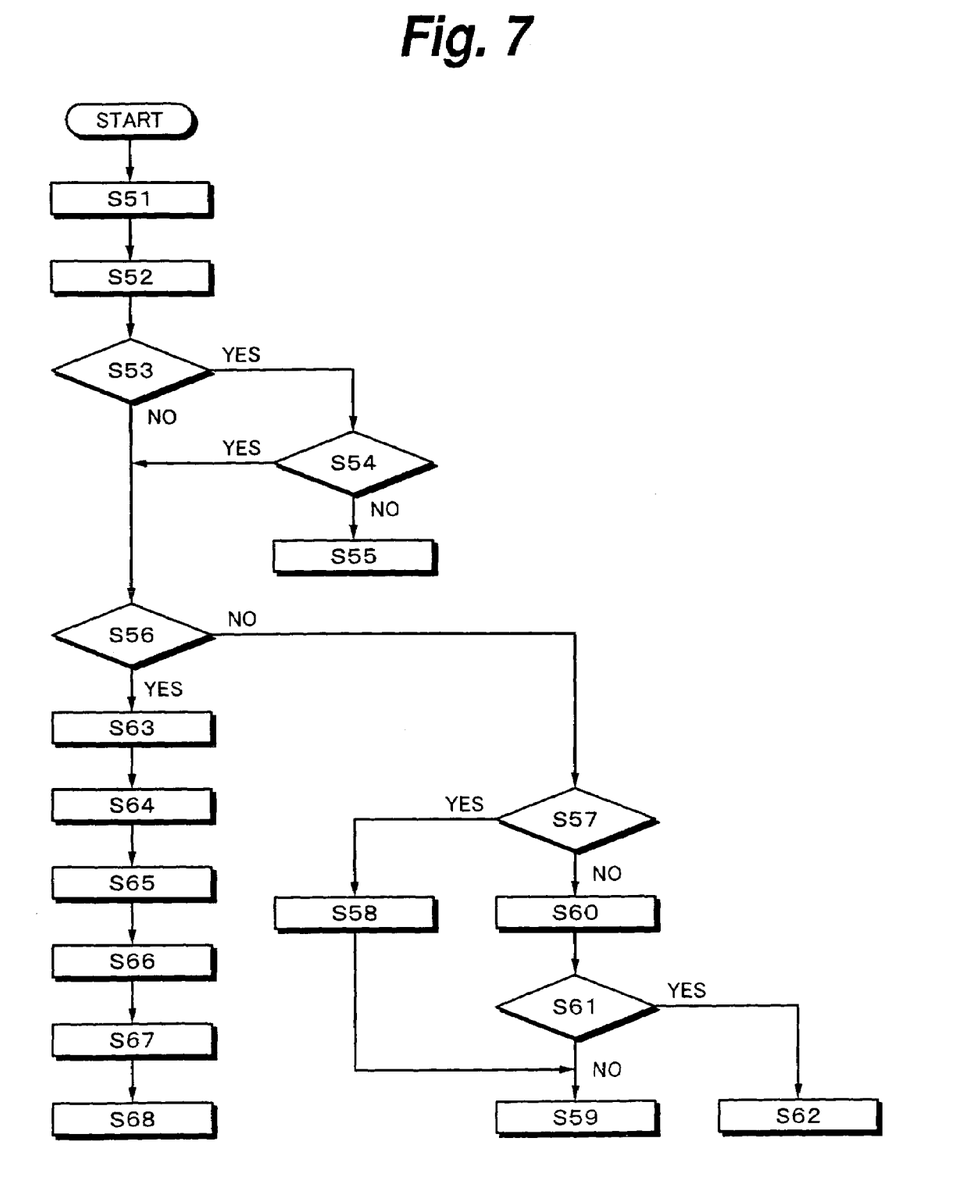
FIG. 7 is a flow chart showing a flow of a process according to another embodiment of the present invention.

FIG. 7 is a flow chart describing another embodiment of the present invention. According to the other embodiment, a user registration is performed without a communication with the server. When a CD-ROM disc on which software has been recorded and an identification number has been additionally recorded is loaded into a computer, a program for a user registration is started (at step S51). At step S52, a registration flag registered for each application is read to the computer.

At step S53, it is determined whether or not a user registration for an application selected by the user has been performed with reference to the registration flag. When the determined result at step S53 represents that the user registration has been performed, the flow advances to step S54. At step S54, it is determined whether or not the user wants to perform the user registration again. When the user does not want to perform the user registration again, the application is started (at step S55). When the determined result at step S53 represents that the user registration has not been performed or when the determined result at step S54 represents that the user wants to perform the user registration again, the flow advances to step S56. At step S56, it is determined whether or not the user wants to perform the user registration at once.

When the determined result at step S56 represents that the user does not want to perform the user registration at once, the flow advances to step S57. At step S57, it is determined whether or not the application program is read from the loaded CD-ROM disc the first time. When the determined result at step S57 represents that the application program is read from the CD-ROM disc the first time, the flow advances to step S58. At step S58, data of the first application program read date is registered to a storing portion such as a hard disk of the computer. Thereafter, the flow advances to step S59. At step S59, the selected application program is read from the CD-ROM disc and the application is started.

When the determined result at step S57 represents that the application program is not read from the loaded CD-ROM disc the first time, the flow advances to step S60. At step S60, data of the first application program read date is read from the storing portion of the computer. At step S61, it is determined whether or not a predetermined time has elapsed from the first application program read date. When the determined result at step S61 represents that the predetermined time has elapsed, the application is not started and the reproducing process of the CD-ROM disc is completed (at step S62). At step S62, a message that reads that since the predetermined time has elapsed, the CD-ROM disc cannot be used is displayed on the computer display. When the determined result at step S61 represents that the predetermined time has not elapsed, the application program is read from the CD-ROM disc and the application is started (at step S59).

When the determined result at step S56 represents that the user wants to perform the user registration at once, the flow advances to step S63. At step S63, an identification number is read from the CD-ROM disc. At step S64, a menu for a user registration is displayed on the computer display. In this case, because an identification number is generated according to a predetermined rule, the computer determines whether or not the identification number that has been read from the CD-ROM disc is a valid identification number. Only when the determined result represents that the identification number is a valid identification number, the next process may start. At step S65, according to the menu for the user registration, the user is required to input his or her name and address. As user information, besides user's name and address, the user may be required to input his or her e-mail address, sex, age, and so forth. According the other embodiment, although the user is required to input his or her name and address, as long as information to be input can identify the user, other information may be used. For example, the user may be requested to input CPU number, network address, or the like so as to automatically perform the user registration.

When the user inputs his or her address and name, data thereof is obtained (at step S66). At step S67, the obtained data of the name and address and the identification number that has been read are correlatively stored in the hard disk or the like of the computer. At step S68, an application program is read from the CD-ROM disc and the application is started. To prevent the identification number, the data of user's name and address, and the data of the first application program read date stored in the hard disc or the like of the computer from being rewritten, it is preferred to record them in an area that the user cannot access.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, in the foregoing description, the present invention is applied to for example a computer. However, the present invention can be also applied to other apparatuses such as a game apparatus. In addition, the present invention is not limited to additional recording of an identification number onto a reflection film. Rather, an identification number can be additionally recorded onto a phase change film, a magneto-optical recording film, and so forth. Moreover, the present invention is not limited to an optical disc medium, but applicable to other data recording mediums such as a semiconductor memory and a memory card.

The invention claimed is:

1. A processing method, comprising the steps of:
   starting a program for a user registration when a recording medium on which program data of at least one program has been recorded is loaded;
   reading identification information that is unique to the recording medium therefrom;
   correlatively storing the identification information that has been read and user's information that has been obtained; and
   reading the program data from the recording medium after the correlatively storing step has been completed.

2. The processing method as set forth in claim 1, further comprising the steps of:
   determining whether or not the user registration has been performed for the program data recorded on the recording medium,
   wherein the correlatively storing step is performed when the determined result of the user registration determining step represents that the user registration has not been performed.

3. The processing method as set forth in claim 2, further comprising the step of:
   determining whether or not the identification information that has been read from the recording medium is valid identification information.

4. The processing method as set forth in claim 3,
   wherein the correlatively storing step is performed when the determined result of the identification information validity determining step represents that the identification information is valid identification information.

5. The processing method as set forth in claim 4,
   wherein when the determined result of the identification information validity determining step represents that the identification information is not valid identification information, the correlatively storing step and the reading step are not performed.

6. The processing method as set forth in claim 3, further comprising the steps of:
   transmitting the identification information that has been read from the recording medium to a server;
   determining whether or not the transmitted identification information is valid identification information on the server side; and
   transmitting the determined result of the server to the user.

7. The processing method as set forth in claim 2, further comprising the step of:
   determining whether or not the user wants to perform the user registration again when the determined result of the user registration determining step represents that the user registration has been performed for the program data recorded on the recording medium.

8. The processing method as set forth in claim 7,
   wherein the reading step is performed when the determined result of the user registration again determining step represents that the user does not want to perform the user registration again.

9. The processing method as set forth in claim 1, further comprising the steps of:
   determining whether or not the user wants to perform the user registration; and
   determining whether or not the user registration has been performed for the program data recorded on the recording medium when the determined result of the user registration determining step represents that the user wants to perform the user registration.

10. The processing method as set forth in claim 9, further comprising the step of:
    determining whether or not the program data is read from the loaded recording medium the first time when the determined result of the user registration determining step represents that the user does not want to perform the user registration.

11. The processing method as set forth in claim 10, further comprising the step of:
    storing information of first program data read date and time and then reading the program data from the recording medium when the determined result of the first time program read determining step represents that the program data is read from the loaded recording medium the first time.

12. The processing method as set forth in claim 10, further comprising the steps of:
    reading information of first program data read date and time of the loaded recording medium when the determined result of the first time program read determining step represents that the program data is not read from the loaded recording medium the first time; and
    determining whether or not a predetermined time has elapsed according to the information of first program data read date and time,
    wherein the program reading step is performed when the determined result of the predetermined time elapse determining step represents that the predetermined time has not elapsed.

13. The processing method as set forth in claim 10,
    wherein the program data reading step is not performed when the predetermined date and time have elapsed.

14. A computer-readable storage medium including program instructions which when executed cause a computer to perform a method of:
    starting a program for a user registration when a recording medium on which application program data of at least one application program has been recorded is loaded;
    reading identification information that is unique to the recording medium therefrom; and
    correlatively storing the identification information that has been read and user's information that has been obtained.

15. The computer readable storage medium as set forth in claim 14, further comprising the step of:
    determining whether or not the user registration has been performed for the application program data recorded on the recording medium,
    wherein the correlatively storing step is performed when the determined result of the user registration determining step represents that the user registration has not been performed.

16. The computer readable storage medium as set forth in claim 15, further comprising the step of:
    determining whether or not the identification information that has been read from the recording medium is valid identification information.

17. The computer readable storage medium as set forth in claim 16,
    wherein the correlatively storing step is performed when the determined result of the identification information validity determining step represents that the identification information is valid identification information.

18. The computer readable storage medium as set forth in claim 17,
    wherein when the determined result of the identification information validity determining step represents that the identification information is not valid identification information, the correlatively storing step is not performed.

19. The computer readable storage medium as set forth in claim 15, further comprising the step of:
    determining whether or not the user wants to perform the user registration again when the determined result of the user registration determining step represents that the user registration has been performed for the application program data recorded on the recording medium.

20. The computer readable storage medium as set forth in claim 19, further comprising the step of:

starting reading the application program data from the recording medium when the determined result of the user registration again determining step represents that the user does not want to perform the user registration again.

21. The computer readable storage medium as set forth in claim 14, further comprising the steps of:
   determining whether or not the user wants to perform the user registration; and
   determining whether or not the user registration has been performed for the application program data recorded on the recording medium when the determined result of the user registration determining step represents that the user wants to perform the user registration.

22. The computer readable storage medium as set forth in claim 21, further comprising the step of:
   determining whether or not the application program data is read from the loaded recording medium the first time when the determined result of the user registration determining step represents that the user does not want to perform the user registration.

23. The computer readable storage medium as set forth in claim 22, further comprising the step of:
   storing information of first application program data read date and time and then reading the application program data from the recording medium when the determined result of the first time application program data read determining step represents that the application program data is read from the loaded recording medium the first time.

24. The computer readable storage medium as set forth in claim 22, further comprising the steps of:
   reading information of first application program data read date and time of the loaded recording medium when the determined result of the first time application program data read determining step represents that the application program data is not read from the loaded recording medium the first time; and
   determining whether or not a predetermined time has elapsed according to the information of first application program data read date and time,
   wherein the application program data reading step is performed when the determined result of the predetermined time elapse determining step represents that the predetermined time has not elapsed.

25. The computer readable storage medium as set forth in claim 22,
   wherein the application program data reading step is not performed when the predetermined date and time have elapsed.

* * * * *